(12) United States Patent
Bae et al.

(10) Patent No.: US 10,466,335 B2
(45) Date of Patent: Nov. 5, 2019

(54) METHOD AND APPARATUS FOR GENERATING IMAGE DATA BY USING REGION OF INTEREST SET BY POSITION INFORMATION

(71) Applicant: Samsung Electronics Co., Ltd, Gyeonggi-do (KR)

(72) Inventors: Jum-han Bae, Gyeonggi-do (KR); Dong-Sik Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 15/317,865

(22) PCT Filed: Jun. 9, 2015

(86) PCT No.: PCT/KR2015/005765
§ 371 (c)(1),
(2) Date: Dec. 9, 2016

(87) PCT Pub. No.: WO2015/190798
PCT Pub. Date: Dec. 17, 2015

(65) Prior Publication Data
US 2017/0123041 A1   May 4, 2017

(30) Foreign Application Priority Data

Jun. 9, 2014   (KR) .......................... 10-2014-0069570

(51) Int. Cl.
| | |
|---|---|
| *G06T 7/246* | (2017.01) |
| *G01S 5/02* | (2010.01) |
| *G01S 3/02* | (2006.01) |
| *G01S 5/12* | (2006.01) |
| *H04N 21/4728* | (2011.01) |

(Continued)

(52) U.S. Cl.
CPC .............. *G01S 5/0252* (2013.01); *G01S 3/02* (2013.01); *G01S 5/12* (2013.01); *G06K 9/2054* (2013.01); *G06K 9/3233* (2013.01); *G06T 7/246* (2017.01); *H04N 5/144* (2013.01); *H04N 5/225* (2013.01); *H04N 21/4728* (2013.01)

(58) Field of Classification Search
CPC ..... G01S 5/0252; G06T 7/246; G06K 9/2054; G06K 9/3233; H04N 5/144; H04N 5/225
USPC ...................................................... 348/169
See application file for complete search history.

(56) References Cited

U.S. PATENT DOCUMENTS

| | | |
|---|---|---|
| 8,294,748 B2 | 10/2012 | Stee et al. |
| 8,570,381 B2 | 10/2013 | Solomon |

(Continued)

FOREIGN PATENT DOCUMENTS

| | | |
|---|---|---|
| JP | 4934992 B2 | 3/2012 |
| KR | 1020080064864 | 7/2008 |
| KR | 1020120065997 | 6/2012 |

OTHER PUBLICATIONS

International Search Report dated Sep. 11, 2015 in connection with International Application No. PCT/KR2015/005765, 3 pages.

*Primary Examiner* — William C Vaughn, Jr.
*Assistant Examiner* — Jae N Noh

(57) ABSTRACT

Methods and apparatuses for generating image data, and systems thereof determine position information of a transceiving device by using characteristics of an electric wave transmitted from the transceiving device; set a region of interest (ROI) in an image by using the determined position information of the transceiving device; and generate an output image.

17 Claims, 10 Drawing Sheets

(51) Int. Cl.
*G06K 9/20* (2006.01)
*G06K 9/32* (2006.01)
*H04N 5/14* (2006.01)
*H04N 5/225* (2006.01)

(56) References Cited

U.S. PATENT DOCUMENTS

| | | |
|---|---|---|
| 2004/0071316 A1 | 4/2004 | Stein et al. |
| 2005/0093976 A1* | 5/2005 | Valleriano .......... H04N 1/32101 348/143 |
| 2006/0002631 A1 | 1/2006 | Fu et al. |
| 2006/0076415 A1 | 4/2006 | Reichenbach et al. |
| 2006/0125679 A1 | 6/2006 | Horibe |
| 2007/0283004 A1* | 12/2007 | Buehler ................ G06Q 30/02 709/224 |
| 2008/0164985 A1 | 7/2008 | Iketani et al. |
| 2011/0193958 A1* | 8/2011 | Martin .................. H04N 7/181 348/143 |
| 2012/0120267 A1 | 5/2012 | Kuroda |
| 2014/0278645 A1* | 9/2014 | Davidson ....... G06Q 10/063114 705/7.15 |
| 2016/0105607 A1 | 4/2016 | Mowry |
| 2016/0156409 A1* | 6/2016 | Chang .................... H04W 4/90 370/315 |
| 2017/0157783 A1* | 6/2017 | Ogawa .................... B25J 19/06 |

\* cited by examiner

[Fig. 1]
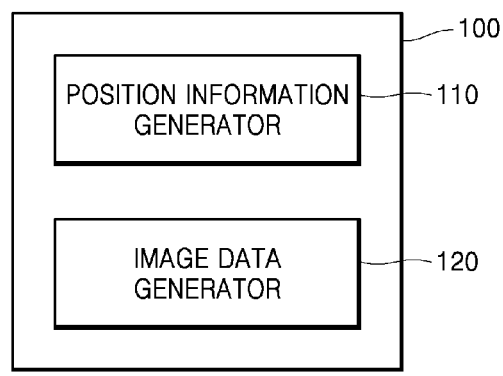
[Fig. 2]
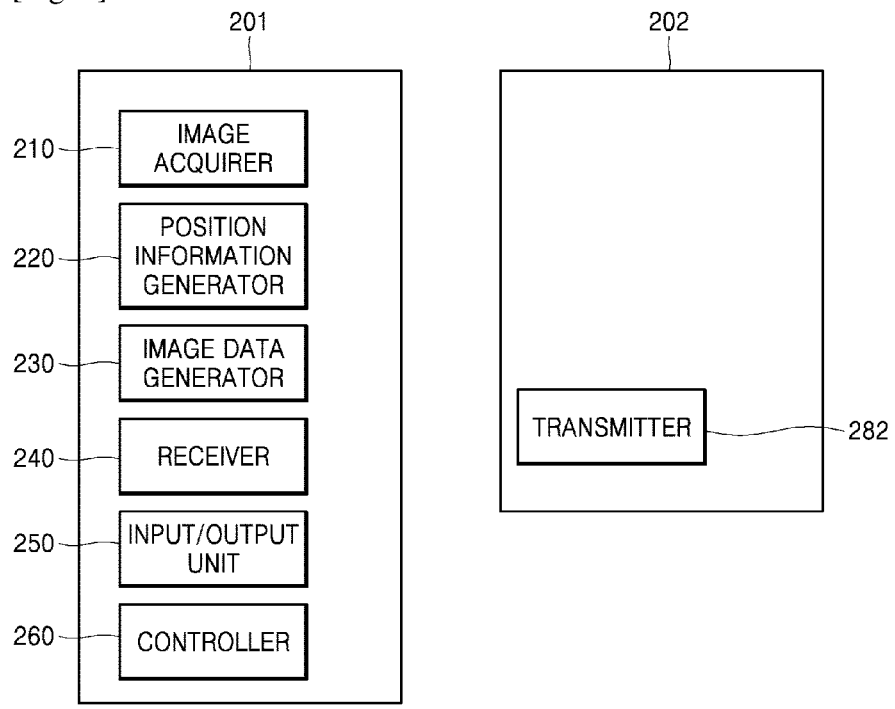

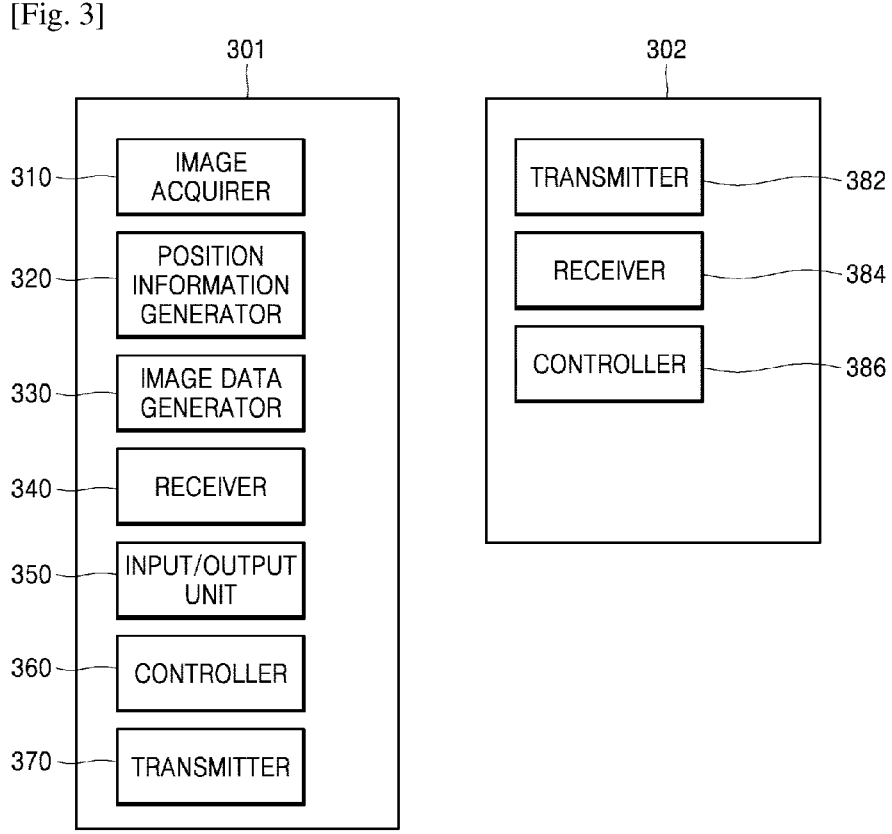

[Fig. 4]
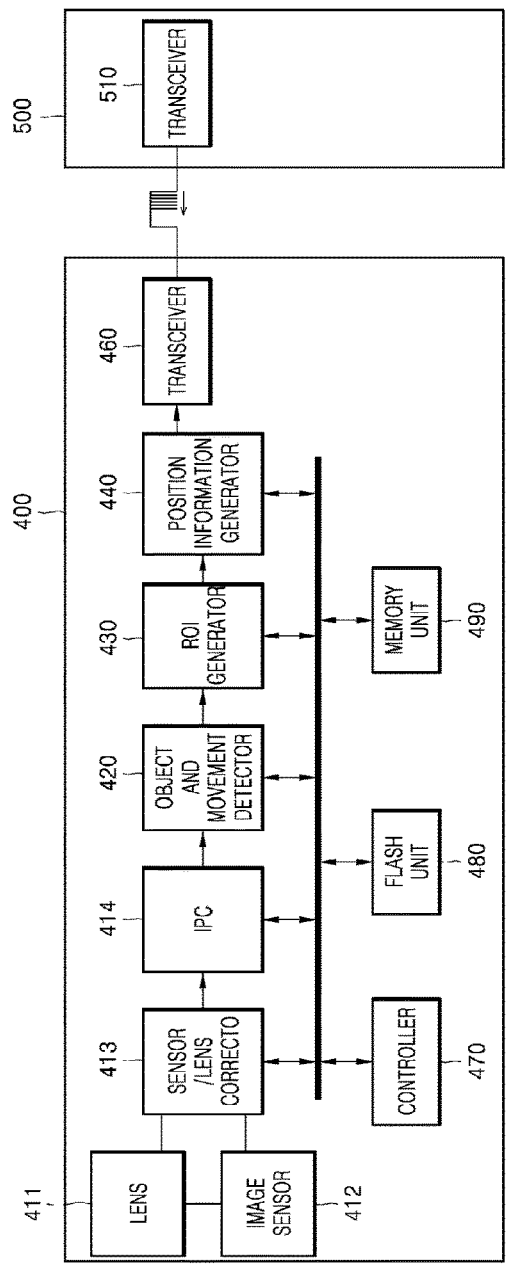
[Fig. 5]
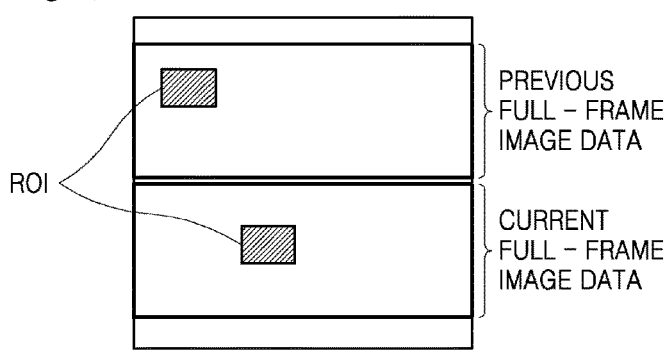

[Fig. 6]
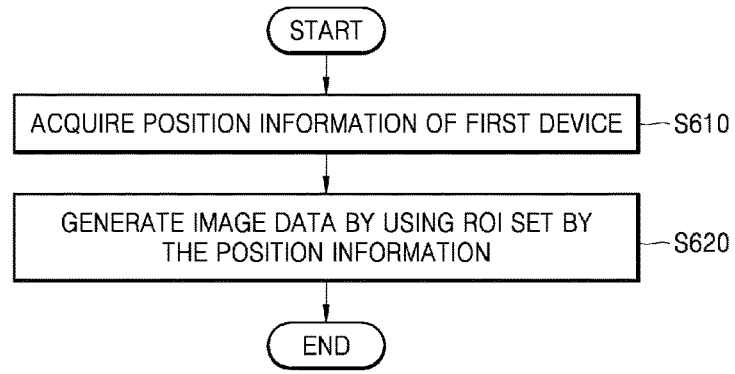
[Fig. 7]
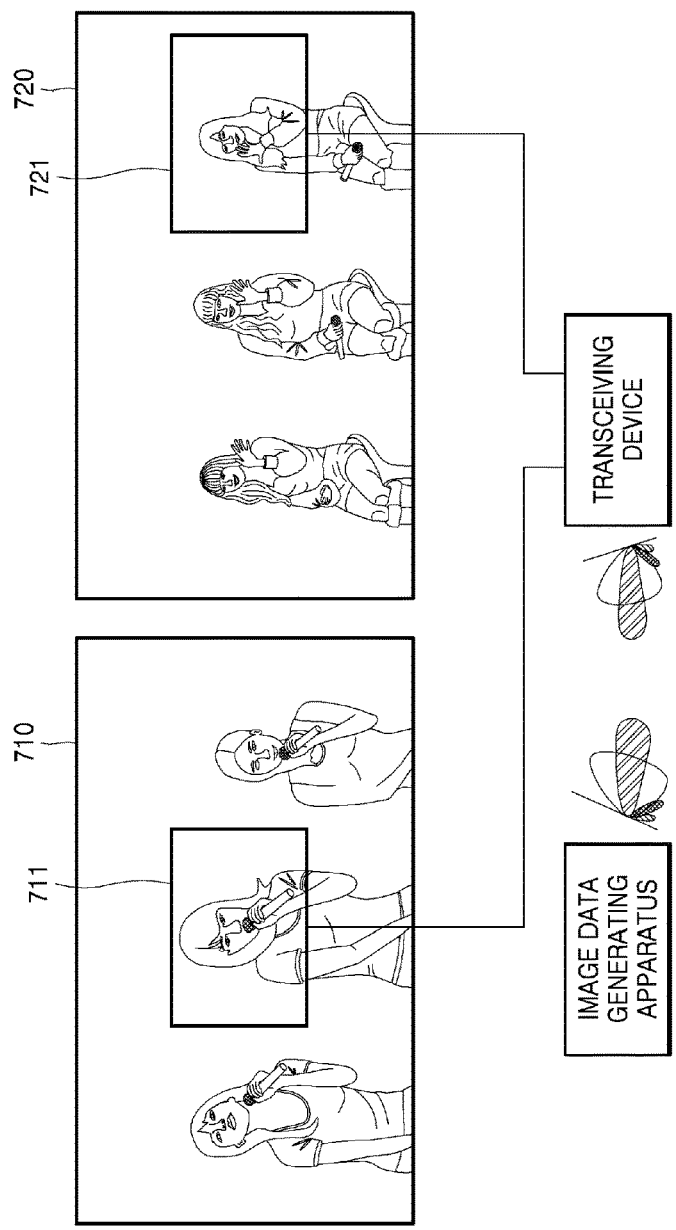

[Fig. 8]
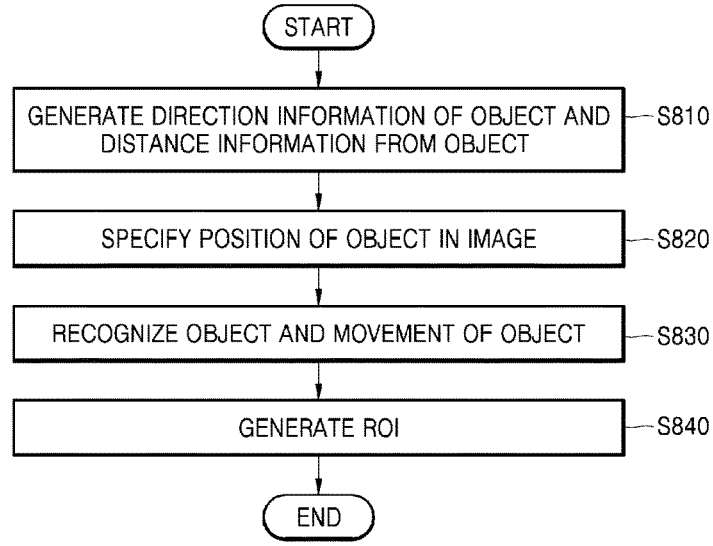
[Fig. 9]
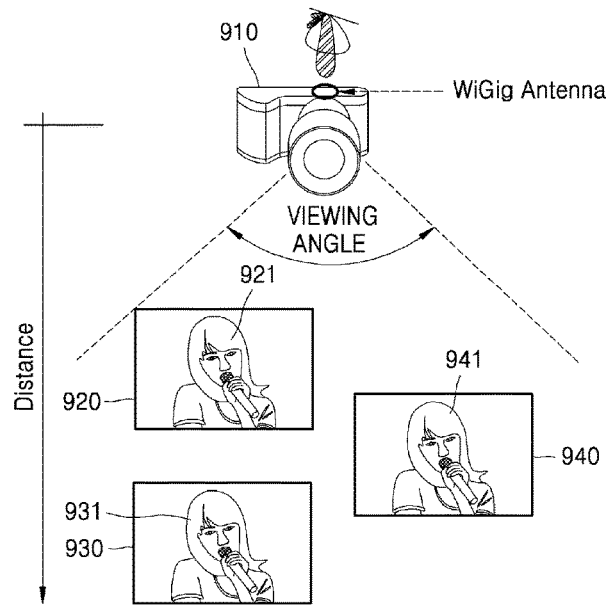
[Fig. 10]
| DIVISION | 802.11ac | 802.11ad |
|---|---|---|
| FREQUENCY | 5Ghz | 60Ghz |
| REACHING DISTANCE | INDOOR : ~ 70m<br>OUTDOOR : ~250m | INDOOR : ~10m |
| MODULATION SYSTEM | OFDM<br>MU-MIMO | Single Carrier<br>OFDM |
| TRANSMISSION RATE | 3.5Gbps(UL**)<br>6.9Gbps(DL**) | 4.6Gbps(SC)<br>2.5Gbps(LP***)<br>6.7Gbps(OFDM) |
| TRANSMISSION RATE (1 ANTENNA) | 866Mbps | |

[Fig. 11]
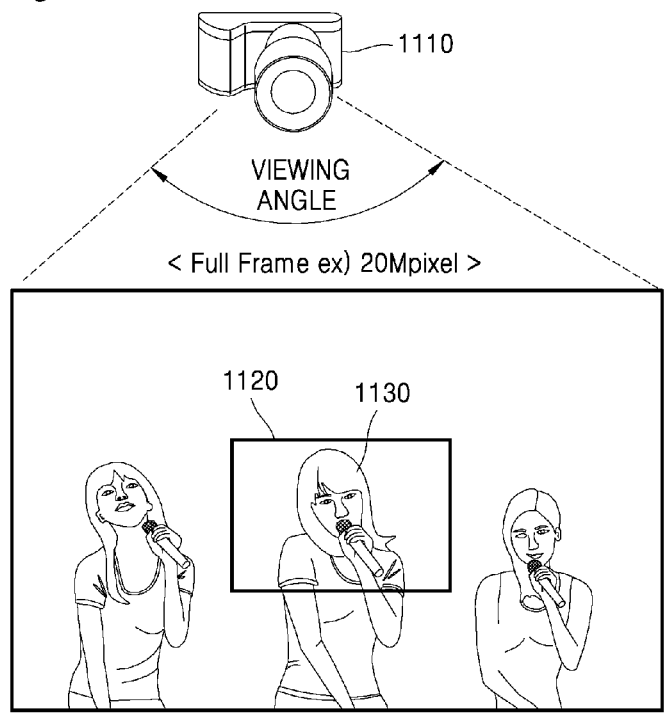
[Fig. 12]
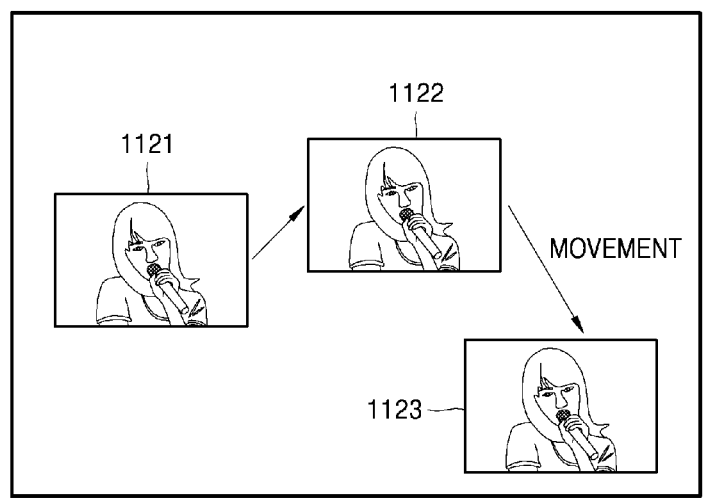
[Fig. 13]
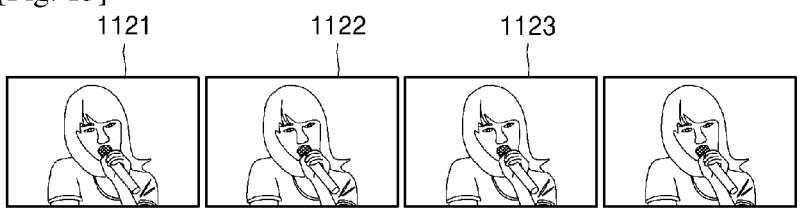
< RESULT IMAGE >

[Fig. 14]
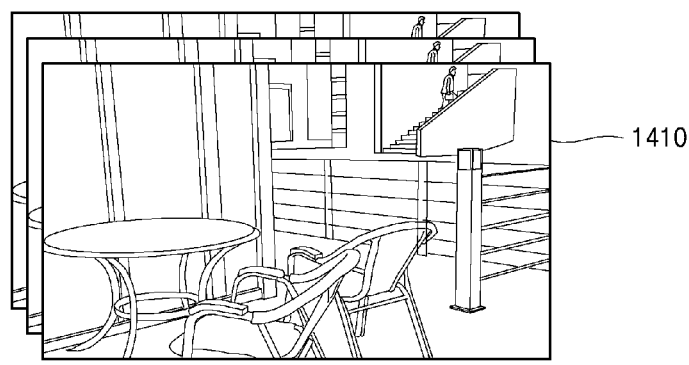
IMAGE COMPRESSION
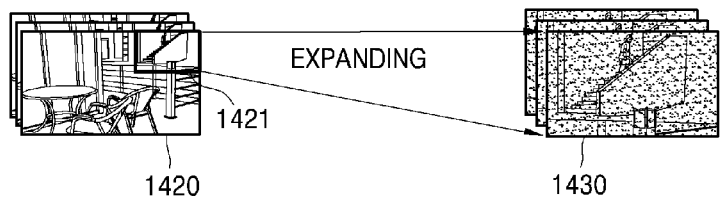
[Fig. 15]
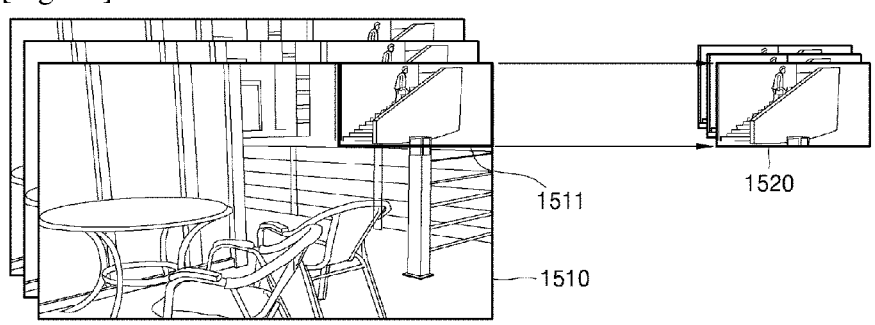

[Fig. 16]
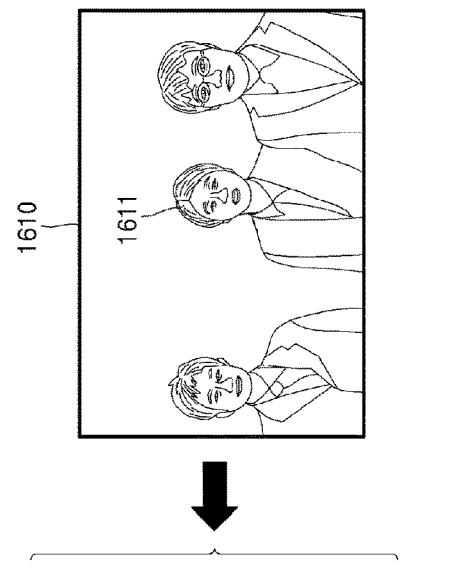
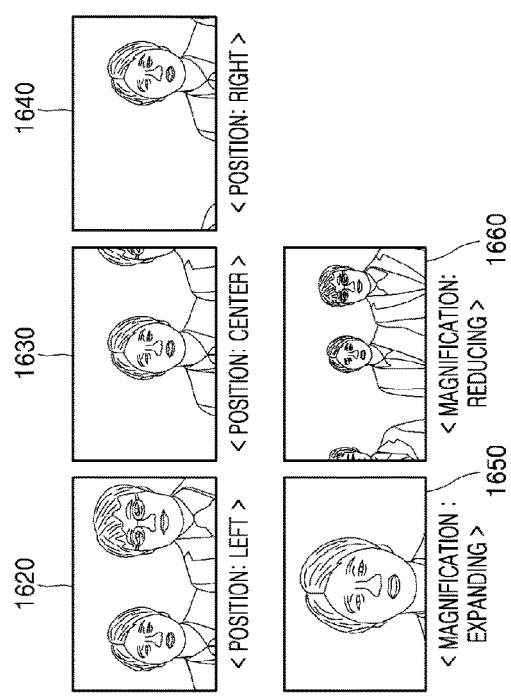
[Fig. 17]
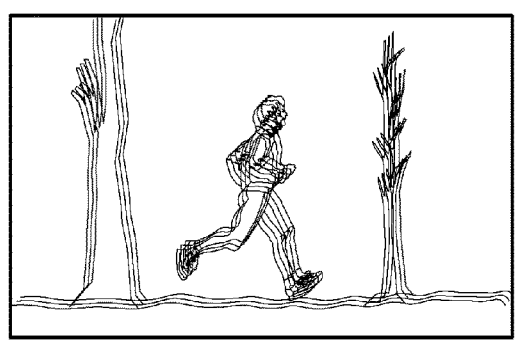

[Fig. 18]
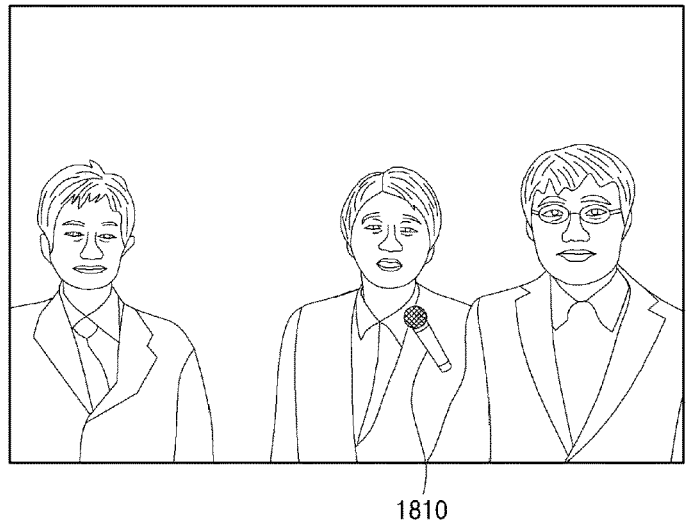
1810
[Fig. 19]
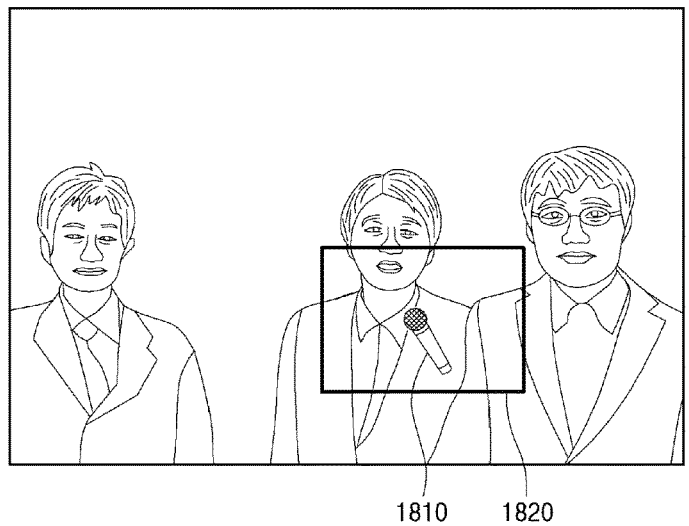
1810   1820
[Fig. 20]
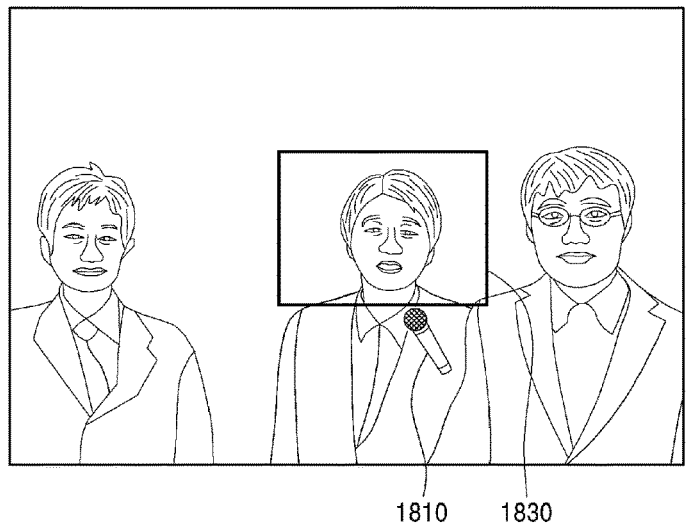
1810   1830

[Fig. 21]
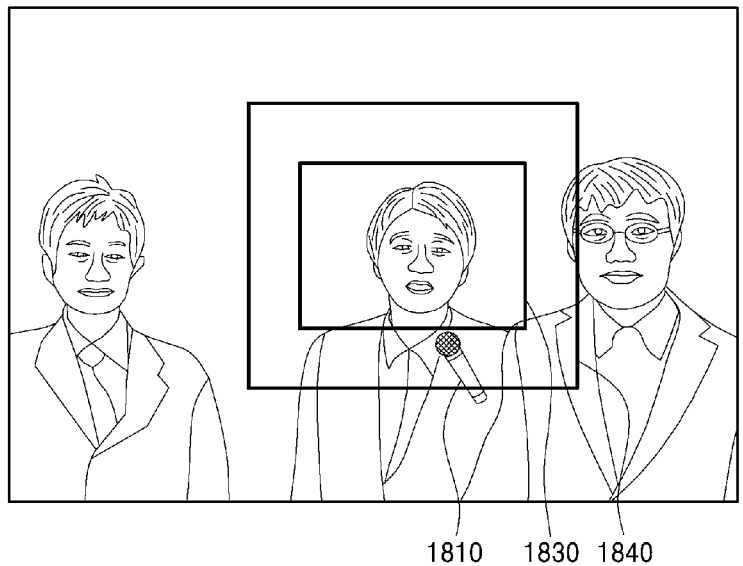
1810  1830  1840
[Fig. 22]
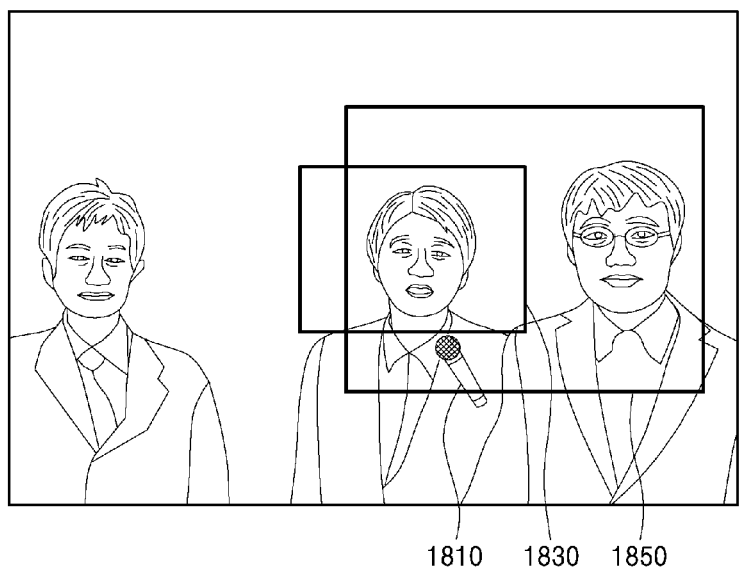
1810  1830  1850
[Fig. 23]
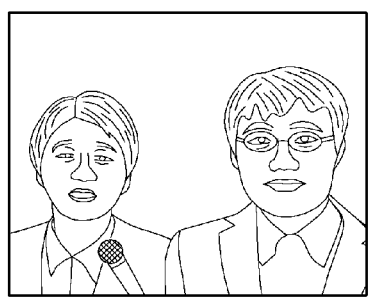

METHOD AND APPARATUS FOR GENERATING IMAGE DATA BY USING REGION OF INTEREST SET BY POSITION INFORMATION

CROSS-REFERENCE TO RELATED APPLICATION(S)

The present application claims priority under 35 U.S.C. § 365 to International Patent Application No. PCT/KR2015/005765 filed Jun. 9, 2015, entitled "METHOD AND APPARATUS FOR GENERATING IMAGE DATA BY USING REGION OF INTEREST SET BY POSITION INFORMATION", and, through International Patent Application No. PCT/KR2015/005765, to Korean Patent Application No. 10-2014-0069570 filed Jun. 9, 2014, each of which are incorporated herein by reference into the present disclosure as if fully set forth herein.

TECHNICAL FIELD

One or more exemplary embodiments relate to methods and apparatuses for generating image data by setting regions of interest.

BACKGROUND ART

A method of setting a region of interest (ROI) in an image by analyzing the image such as face recognition has been developed. However, the image analyzing method can be applied to only when an object to be recognized is displayed on the image. For example, when the ROI is set by recognizing a face, it is impossible to recognize a rear view of the object.

DISCLOSURE OF INVENTION

Technical Problem

The present invention provides a method and apparatus for generating image data by using a region of interest set by position information.

Solution to Problem

One or more exemplary embodiments include a method and apparatus for generating image data by using a region of interest set by position information.

Advantageous Effects of Invention

In a process of generating image data by using a region of interest set by position, whereby the region of interest may be set efficiently compared with setting by image data interpretation only.

BRIEF DESCRIPTION OF DRAWINGS

These and/or other aspects will become apparent and more readily appreciated from the following description of the exemplary embodiments, taken in conjunction with the accompanying drawings in which:

FIG. 1 is a block diagram illustrating an image data generating apparatus, according to an embodiment of the inventive concept;

FIG. 2 is a block diagram illustrating an image data generation system, according to an embodiment of the inventive concept;

FIG. 3 is a block diagram illustrating an image data generation system, according to another embodiment of the inventive concept;

FIG. 4 is a block diagram illustrating in more detail an image data generation system, according to another embodiment of the inventive concept;

FIG. 5 is a view of an example in which a region of interest (ROI) is set in full-frame image data by an image data generation system, according to an embodiment of the inventive concept;

FIG. 6 is a flowchart illustrating an image data generating method, according to an embodiment of the inventive concept;

FIG. 7 is a view of an example of setting an ROI according to an image data generating method, according to an embodiment of the inventive concept;

FIG. 8 is a detailed flowchart illustrating an ROI generating method in an image data generating method, according to an embodiment of the inventive concept;

FIG. 9 is a view illustrating a position of an object specifying method by an image data generating apparatus, according to an embodiment of the inventive concept;

FIG. 10 is a diagram illustrating characteristics of an electric wave used by an image data generating apparatus and a transceiving device, according to an embodiment of the inventive concept;

FIGS. 11 to 13 are views illustrating an image data generating method using an ROI generated by tracking a moving object by an image data generating apparatus, according to an embodiment of the inventive concept;

FIGS. 14 and 15 are conceptual diagrams illustrating a method of generating an image corresponding to an ROI by an image data generating apparatus, according to an embodiment of the inventive concept;

FIG. 16 is a view illustrating a method of setting an ROI by an image data generating apparatus, according to an embodiment of the inventive concept;

FIG. 17 is a view illustrating a method of generating an object image moving quickly by an image data generating apparatus, according to an embodiment of the inventive concept; and FIGS. 18 to 23 are views illustrating methods of resetting an ROI by an image data generating apparatus, according to an embodiment of the inventive concept.

BEST MODE FOR CARRYING OUT THE INVENTION

One or more exemplary embodiments include a method and apparatus for generating image data by using a region of interest set by position information.

Additional aspects will be set forth in part in the description which follows and, in part, will be apparent from the description, or may be learned by practice of the presented exemplary embodiments.

According to one or more exemplary embodiments, a method of generating image data for use in an image data generating apparatus includes acquiring of position information of a first device from the first device; and generating of the image data including an image of a region of interest (ROI) by using the ROI set by the position information.

The acquiring of the position information may include generating of the position information of the first device by using an electric wave transmitted from the first device.

The generating of the position information of the first device by using the electric wave transmitted from the first device may further include determining of direction information of the first device from the image data generating apparatus to the first device by using an electric wave-receiving direction from the first device.

The determining of direction information of the first device from the image data generating apparatus to the first device by using the electric wave-receiving direction from the first device may include determining of, using the image data generating apparatus, an electric wave-receiving direction in which the strongest electric wave from the first device is received by using a beam forming method; and determining of direction information of the first device by using the electric wave-receiving direction.

The generating of the image data including the image of the ROI by using the ROI set by the position information may include acquiring of an image; determining of a position of an ROI generated in the image by using the direction information of the first device; and generating of image data of the image by using the image and the ROI.

The generating of the position information of the first device by using the electric wave transmitted from the first device may further include generating of information about a distance between the first device and the image data generating apparatus by using an electric wave-receiving intensity from the first device.

The generating of the image data including the image of the ROI by using the ROI set by the position information may include acquiring of an image; determining of a size of an ROI generated in the image by using the distance information; and generating of image data of the image by using the image and the ROI.

The generating of the image data by using the ROI set by the position information may include performing image effects on both of an image portion which corresponds to the ROI and an image portion which does not correspond to the ROI, the image effects being different from each other, or performing an image effect only on any one of the image portion corresponding to the ROI and the image portion not corresponding to the ROI.

The image of the image data may be a moving image or a still image.

The generating of the image data by using the ROI set by the position information may include generating of image data of the acquired image; and outputting of only image data of an image portion corresponding to the ROI from the image of the image data.

The generating of the image data by using the ROI set by the position information may include acquiring of only an image corresponding to the ROI; and outputting of image data corresponding to the acquired image.

The generating of the image data by using the ROI set by the position information may include generating of first image data of an acquired image; generating of an ROI in an image of the first image data; and generating of second image data corresponding to the ROI, in which a size of the first image data may be less than that of the second image data.

The generating of the image data by using the ROI set by the position information may include at least one operation from among determining of an position of the ROI according to a position of an object in the image; determining of a size of the ROI according to a size of an object in the image; and determining of a tracking speed of the object according to a moving speed of the object in the image.

According to one or more exemplary embodiments, a method of generating image data includes transmitting of an electric wave to an image data generating apparatus from a transceiving device; determining of position information of the transceiving device by receiving the electric wave from the transceiving device to the image data generating apparatus; and generating of image data including an image of an ROI by using the ROI set by the position information by the image data generating apparatus.

According to one or more exemplary embodiments, a non-transitory computer-readable recording medium may be recorded with a program for performing at least one of the methods described above.

According to one or more exemplary embodiments, an apparatus for generating image data includes a position information generator to acquire position information of a first device; and an image data generator to generate image data including an image of an ROI by using the ROI set by the position information.

The apparatus may further include a receiver to receive an electric wave from the first device, in which the position information generator may generate position information of the first device by using an electric wave transmitted from the first device.

The position information generator may determine direction information of the first device in the image data generating apparatus by using an electric wave-receiving direction from the first device, and may generate information about a distance between the first device and the image data generating apparatus by using an electric wave-receiving intensity from the first device.

The position information generator may determine direction information of the first device according to a direction in which the strongest electric wave from the first device is received by using a beam forming method.

The image data generator may generate only image data of an image portion corresponding to the ROI.

According to one or more exemplary embodiments, a system for generating image data includes a transceiving device to transmit an electric wave to an image data generating apparatus; and the image data generating apparatus to determine position information of the transceiving device by receiving the electric wave from the transceiving device, and to generate image data including an image of an ROI by using the ROI set by the position information of the transceiving device.

MODE FOR THE INVENTION

This application claims the benefit of Korean Patent Application No. 10-2014-0069570, filed on Jun. 9, 2014, in the Korean Intellectual Property Office, the disclosure of which is incorporated herein in its entirety by reference.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram illustrating an image data generating apparatus 100, according to an embodiment of the inventive concept. The image data generating apparatus 100 according to an exemplary embodiment includes a position information generator 110 and an image data generator 120.

The position information generator 110 generates position information of an object to be photographed. For example, the position information generator 110 may generate position information of the object by receiving the position information of the object from the object or an external device. Alternatively, the position information generator 110 may determine position information of the object by using an electric wave transmitted from the object. The position information generator 110 may determine the position information of the object from the electric wave transmitted from the object by using a beam forming method. The position information generator 110 transmits the generated position information of the object to the image data generator 120.

In an exemplary embodiment, the position information generator 110 may determine a positioning direction of the object by determining an electric wave-receiving direction from the object. For example, if an electric wave is transmitted to the position information generator 110 from the object along a specific direction, the position information generator 110 may detect a position of the object by reverse tracking of the specific direction in which the electric wave is transmitted.

In an exemplary embodiment, the position information generator 110 may determine a separation distance between the object and the image data generating apparatus 100 by analyzing an electric wave-receiving intensity from the object. For example, the position information generator 110 may determine a separation distance of the image data generating apparatus 100 from the object by analyzing an electric wave-receiving intensity from the object according to a numerical value of preset power.

The image data generator 120 generates image data of the object. The image of the image data includes a moving image or a still image. The image data generator 120 may set a region of the object located in the image as a region of interest (ROI) by using the position information of the object that is transmitted from the position information generator 110, and may generate the image data of the object according to the set ROI.

In an exemplary embodiment, the image data generator 120 may set an ROI in an image acquired by using the position information of the object. The image data generator 120 may set the ROI by using at least one of a positioning direction of the object and a separation distance from the object. The image data generator 120 may set a region in which the object is located as the ROI in an image acquired by using an image acquiring direction and the positioning direction of the object of the image data generating apparatus 100. The image data generator 120 may determine a size of the ROI based on the separation distance between the object and the image data generating apparatus 100.

FIG. 2 is a block diagram illustrating an image data generation system, according to an embodiment of the inventive concept. The image data generation system according to an exemplary embodiment includes an image data generating apparatus 201 and a transceiving device 202 worn by the object. FIG. 2 illustrates a block diagram of the image data generating apparatus 201 and the transceiving device 202, according to various exemplary embodiments.

The image data generating apparatus 201 according to an exemplary embodiment includes an image acquirer 210, a position information generator 220, an image data generator 230, a receiver 240, an input/output unit 250, and a controller 260.

The controller 260 controls the image acquirer 210 of the image data generating apparatus 201, the position information generator 220, the image data generator 230, receiver 240, and the input/output unit 250, generates position information of the transceiving device 202 by using an electric wave transmitted from the transceiving device 202 to the receiver 240, and further generates image data with respect to the object by generating an ROI in an image by using the position information of the transceiving device 202.

The image acquirer 210 generates an image corresponding to the object. The image acquirer 210 may generate the image by collecting a light source corresponding to the object by including at least one lens.

The position information generator 220 generates position information of the object like the position information generator 110 of FIG. 1. The position information of the object may be information about a relative position to the position of the transceiving device 202. For example, the position information generator 220 may receive an electric wave transmitted from the transceiving device 202 via the receiver 240, and may determine a positioning direction of the object by analyzing the electric wave-receiving direction. Furthermore, the position information generator 220 may determine a separation distance between the object and the image data generating apparatus 201 by analyzing an electric wave-receiving intensity. The position information generator 220 may determine the electric wave-receiving direction or electric wave-receiving intensity by controlling the receiver 240 by using a beam forming method.

The position information generator 220 may determine a position value of the transceiving device 202 which is corrected according to an input value by a user or a fixed value previously input, as the position information of the object. For example, according to the value input by the user or the fixed value previously input, the position information generator 220 may determine a position value located more right than the position value of the transceiving device 202 or a position value located farther than the position value of the transceiving device 202, as the position information of the object.

The image data generator 230 sets an ROI to generate the image data by using the position information of the object that is generated by the position information generator 220 and generates the image data with respect to the object by using the ROI.

The image data generator 230 may generate the ROI by using at least one of the positioning direction of the object and the separation distance between the object and the image data generating apparatus 201 like the image data generator 120 of FIG. 1. By using an image acquiring direction of the image acquirer 210 and the positioning direction of the object, the image data generator 230 may set the ROI with respect to the position of the object in the acquired image when the object is located in the acquired image.

A shape and size of the ROI may be preset. For example, the ROI may be a square-shaped region having a preset size, in which the object is located in a center of the ROI. The image data generator 230 may determine the size of the ROI based on the separation distance between the object and the current image data generating apparatus 201.

The image data generator 230 may determine a center position in which the object is located in the image or a position separated from the position of the object in the image, as a center position of the ROI. Furthermore, the image data generator 230 may determine a position separated from the position of the object according to the value input by the user or the fixed value previously input as a center position of the ROI. The image data generator 230 may minutely adjust the center position of the ROI corresponding to the position of the object in the image according to the user input. For example, the image data generator 230 may determine a position separated by a predetermined distance in a right diagonal direction from the position of the object as a center position of the ROI, according to the user input.

The receiver 240 receives the electric wave from the transceiving device 202. The receiver 240 may receive the electric wave transmitted from the transceiving device 202 located in a specific direction. The receiver 240 may receive the electric wave transmitted from the transceiving device 202 with directionality. For example, the receiver 240 may receive the electric wave transmitted from the transceiving device 202 by using a beam forming method. The receiver 240 may receive an electric wave in the 60 GHz band transmitted from the transceiving device 202 with directionality.

The input/output unit 250 may receive a request for a predetermined operation from the user and may output visual information, auditory information such as sound, and tactile information such as vibration to the user as an operation corresponding to the request. For example, the input/output unit 250 may include a physical button, a touch screen, an image recognition sensor and so on as an input unit, and may further include a display device, a speaker, a vibrator and so on as an output unit.

The transceiving device 202 according to an exemplary embodiment includes a transmitter 282. The transmitter 282 may transmit an electric wave to the image data generating apparatus 201. The transmitter 282 may transmit an electric wave having directionality. For example, the transmitter 282 may transmit an electric wave to the image data generating apparatus 201 by using a beam forming method. The transmitter 282 may use an electric wave in the 60 GHz band in order to transmit an electric wave having directionality.

FIG. 3 is a block diagram illustrating an image data generation system, according to another embodiment of the inventive concept. The image data generation system of FIG. 3 may be formed by adding several elements to the image data generation system of FIG. 2. Descriptions of the same elements as in the image data generation system of FIG. 2 will be omitted.

An image data generating apparatus 301 may further include a transmitter 370 controlled by a controller 360. A transceiving device 302 may further include a receiver 384 corresponding to the transmitter 370. The image data generating apparatus 301 may inform its position to the transceiving device 302 by using the transmitter 370. The transmitter 370 of the image data generating apparatus 301 may transmit an electric wave to the transceiving device 302 by using a beam forming method. The transmitter 370 may use an electric wave in the 60 GHz band in order to transmit an electric wave having directionality.

The transceiving device 302 further includes a controller 386. The controller 386 controls the receiver 384 and may receive the electric wave having directionality from the image data generating apparatus 301. The controller 386 may determine a positioning direction of the image data generating apparatus 301 by analyzing an electric wave-receiving direction, and may control a transmitter 382 to transmit an electric wave having directionality in the positioning direction of the image data generating apparatus 301.

FIG. 4 is a block diagram illustrating in more detail an image data generation system, according to another embodiment of the inventive concept. FIG. 4 illustrates an image data generating apparatus 400 and a transceiving device 500, according to various exemplary embodiments. The image data generating apparatus 400 and the transceiving device 500 perform wireless gigabit alliance (WiGig) communication and the image data generating apparatus 400 generates position information of the transceiving device 500.

The image data generating apparatus 400 according to an exemplary embodiment includes a lens 411, an image sensor 412, a sensor/lens corrector 413, an image processing chain (IPC) 414, an object and movement detector 420, an ROI generator 430, a position information generator 440, a transceiver 460, a controller 470, a flash unit 480, and a memory unit 490.

The lens 411 collects and receives light of the object. The image sensor 412 generates image data by using the light received via the lens 411. The sensor/lens corrector 413 controls the lens 411 so as to acquire an image required by a user, and further controls the image sensor 412 in order to generate data of the image required by the user.

In order to acquire the required image, the sensor/lens corrector 413 may control the lens 411 and the image sensor 412 by using an ROI generated by the ROI generator 430. For example, the sensor/lens corrector 413 may control the lens 411 so as to acquire only an image with respect to the ROI generated by the ROI generator 430. The sensor/lens corrector 413 may control the image sensor 412 so as to acquire only the image with respect to the ROI generated by the ROI generator 430 from among images acquired in the lens 411.

The IPC 414 generates an image file by using the image data generated by the image sensor 412. The IPC 414 performs a series of processes for converting image data which has a raw format and is input from the image sensor 412, into pieces of digital image data having a specific format such as an YCC format. The pieces of digital image data, which have the YCC format and resulting from conversion by the IPC 414, may be stored in the memory unit 490 under the control of the controller 470. In the case of photographing, many pieces of YCC data such as #1 YCC, #2 YCC . . . and #n YCC may be stored in the memory unit 490.

The IPC 414 may store only data of the image required by the user in the memory unit 490. For example, the IPC 414 may convert only data of an image corresponding to the ROI of the image data, which has a raw format and is input from the image sensor 412, into pieces of digital image data having a specific format, and may store the image data in the memory unit 490.

The object and movement detector 420 may detect the object or movement of the object from the image data. The object and movement detector 420 may change a position of the ROI by using a position of the object detected from the image or movement of the position of the object according to the object's movement. The object may be a person's face to photograph. Over time, the object's movement appears in the image. The object and movement detector 420 may detect the object's movement and generate movement information thereof, and may transmit the movement information to the ROI generator 430. In a similar manner, the object and movement detector 420 may transmit the position of the object detected from the image as position information of the object to the ROI generator 430.

The object and movement detector 420 may transmit size information of the object detected from the image to the ROI generator 430. The object and movement detector 420 may transmit the size information of the moving object in the image to the ROI generator 430. For example, the object and movement detector 420 may determine the minimum size of the ROI containing the moving object and transmit size information of the ROI to the ROI generator 430.

The ROI generator 430 determines an ROI set in the image or the image data. The ROI generator 430 may generate the ROI by using object direction information and object distance information transmitted from the transceiver 460. Alternatively, the ROI generator 430 may generate a position of the ROI in the image by using position information of the object or movement information of the object that is transmitted from the object and the transceiver 460.

The ROI generator 430 may set the ROI by using at least one of a positioning direction of the object and a separation distance from the object. The ROI generator 430 may generate an ROI to use in the lens 411, the image sensor 412, or the IPC 414.

The ROI generator 430 may use an image acquiring direction of the lens 411 and the positioning direction of the object and thus, may set the ROI corresponding to the position of the object in the acquired image when the object is located in the acquired image. A shape and size of the ROI may be preset. For example, the ROI may be a square-shaped region having a preset size, in which the object is located in a center of the ROI. The ROI generator 430 may determine the size of the ROI based on the separation distance between the object and the current image data generating apparatus 400.

The ROI generator 430 may determine a center position of a region in which the object is located in the image or a position separated from the center position of the object in the image, as a center position of the ROI. Furthermore, the ROI generator 430 may determine a position separated from the position of the object according to the value input by the user or the fixed value previously input as a center position of the ROI. The ROI generator 430 may minutely adjust the center position of the ROI corresponding to the position of the object in the image according to the user input. For example, the ROI generator 430 may determine a position separated by a predetermined distance in a right diagonal direction from the position of the object as a center position of the ROI according to the user input.

The ROI generator 430 may correct the ROI position in the image by using position information of the object or the movement information of the object that is transmitted from the object and the transceiver 460. For example, as for the position and size of the ROI set by using the information transmitted from the transceiver 460, the ROI generator 430 may precisely reset the ROI position to the position of the object in the image by using the information transmitted from the object and the movement detector 420, or may reset the ROI size so as to contain the entire region displaying the object in the image. The ROI generator 430 may transmit information of the ROI generated as described above to the controller 470.

The position information generator 440 generates position information of the object like the position information generator 110 of FIG. 1. The position information of the object may be information about a position of the transceiving device 500. For example, the position information generator 440 may receive the electric wave transmitted from the transceiving device 500 via the transceiver 460, and may determine a positioning direction of the object by analyzing the electric wave-receiving direction. Furthermore, the position information generator 440 may determine a separation distance between the object and the image data generating apparatus 400 by analyzing an electric wave-receiving intensity. The position information generator 440 may determine the electric wave-receiving direction or electric wave-receiving intensity by controlling the transceiver 460 by using a beam forming method.

The position information generator 440 may determine a position value of the transceiving device 500 which is corrected according to an input value by a user or a fixed value previously input as the position information of the object. For example, according to the value input by the user or the fixed value previously input, the position information generator 440 may determine a position value located more right than the position value of the transceiving device 500 or a position value located farther than the position value of the transceiving device 500, as the position information of the object.

The transceiver 460 receives the electric wave from the transceiving device 500. The transceiver 460 may receive the electric wave transmitted from the transceiving device 500 located in a specific direction. The transceiver 460 may receive the electric wave transmitted from the transceiving device 500 with directionality. For example, the transceiver 460 may receive the electric wave transmitted from the transceiving device 500 by using a beam forming method. The transceiver 460 may receive an electric wave in the 60 GHz band transmitted from the transceiving device 500 with directionality. The transceiver 460 may perform the WiGig communication with the transceiving device 500 which is an external device. As there may be many other users, the image data generating apparatus 400 and the transceiving device 500 may transceiver between each other a specific electric wave via a WiFi service set identifier (SSID).

The controller 470 generates an ROI corresponding to the object in an image acquired by the image data generating apparatus 400 by controlling each element of the image data generating apparatus 400 and thus, generates the image data. The controller 470 may control the lens 411, the image sensor 412, the sensor/lens corrector 413, the IPC 413, the object and movement detector 420, the ROI generator 430, the position information generator 440, the transceiver 460, the flash unit 480, and the memory unit 490.

The controller 470 may control the lens 411, the image sensor 412 or the IPC 414 by using information of the ROI transmitted from the ROI generator 430 and thus, may generate image data with respect to the object. FIG. 5 is a view of an example in which an ROI is set in full-frame image data by using the ROI information by the controller 470. FIG. 5 illustrates a situation in which the ROI position is changed from previous full-frame image data to current full-frame image data according to a movement of the position of the object in the image.

As illustrated in FIG. 5, the controller 470 may set the ROI in the image data and output data of an image corresponding to the ROI as image data. For example, the controller 470 may store the data of the image corresponding to the ROI in the memory unit 490. In another embodiment, the controller 470 may perform image effects on both of an image portion which corresponds to the ROI and an image portion which does not correspond to the ROI, the image effects being different from each other, and may store the image data on which the image effects are performed in the memory unit 490. For example, the controller 470 may not perform any image effect on a portion corresponding to the ROI, and may perform an out-focusing effect only on a portion not corresponding to the ROI. The controller 470 may perform the above effects by using the IPC 414 or another image process module. The controller 470 may control the sensor/lens corrector 413 and/or the image sensor 412 and may output only the data of the image corresponding to the ROI as image data.

The controller 470 may control the sensor/lens corrector 413 and/or the lens 411 so as to acquire only the image corresponding to the ROI. For example, the controller 470 may control the sensor/lens corrector 413 and/or the lens 411 so as to receive only light corresponding to the ROI to the image sensor 412 via the lens 411. Furthermore, the controller 470 may control the sensor/lens corrector 413 and/or the lens 411 so as to focus the image corresponding to the ROI. For example, the controller 470 may control the sensor/lens corrector 413 and/or the lens 411 so as to generate the image corresponding to the ROI via the lens 411 without blurring.

The flash unit 480 may generate a flash to capture an image according to the controller 470. The memory unit 490 may store image data, or software programs and a number of other data which are required for operations of the controller 470 and each function unit, according to the controller 470.

The transceiving device 500 according to an exemplary embodiment includes a transceiver 510.

The transceiver 510 transmits an electric wave to the image data generating apparatus 400. The transceiver 510 may transmit the electric wave to the image data generating apparatus 400 located in a specific direction. The transceiver 510 may transmit the electric wave to the image data generating apparatus 400 with directionality. For example, the transceiver 510 may transmit the electric wave to the image data generating apparatus 400 by using a beam forming method. The transceiver 510 may transmit an electric wave in the 60 GHz band to the image data generating apparatus 400 with directionality. For example, the transceiver 510 may perform the WiGig communication with the image data generating apparatus 400 which is an external device. As there may be many other users, the transceiver 510 and the image data generating apparatus 400 may transceive between each other a specific electric wave via the WiFi SSID.

The transceiver 510 may receive an electric wave from the image data generating apparatus 400. The transceiver 510 may receive an electric wave transmitted from the image data generating apparatus 400 located in a specific direction. The transceiver 510 may transmit its electric wave to an electric wave-receiving direction. The transceiver 510 may receive an electric wave transmitted from the image data generating apparatus 400 with directionality. For example, the transceiver 510 may receive an electric wave transmitted from the image data generating apparatus 400 by using a beam forming method. The transceiver 510 may receive an electric wave in the 60 GHz band transmitted from the image data generating apparatus 400 with directionality.

FIG. 6 is a flowchart illustrating an image data generating method, according to an embodiment of the inventive concept. First, the image data generating apparatus 100 acquires position information of a first device 202 (S610). The first device 202 is a transceiving device which is worn by or attached on the object. The first device 202 exists in the position of the object and transmits an electric wave to the image data generating apparatus 100.

The image data generating apparatus 100 may generate position information of the first device 202 by using an electric wave transmitted from the first device 202. The image data generating apparatus 100 may determine direction information of the first device 202 from the image data generating apparatus 100 to the first device 202 by using an electric wave-receiving direction from the first device 202. The image data generating apparatus 100 may determine an electric wave-receiving direction in which the strongest electric wave from the first device 202 is received by using a beam forming method, and may determine direction information of the first device 202 by using the electric wave-receiving direction.

The image data generating apparatus 100 may generate information about a distance between the first device 202 and the image data generating apparatus 100 by using an electric wave-receiving intensity from the first device 202.

Next, the image data generating apparatus 100 generates image data by using an ROI set by the position information of the first device (S620). The image data generating apparatus 100 may generate image data including the image of the ROI by using the ROI set by the position information of the first device 202. The image data generating apparatus 100 may acquire an image and determine the position of the ROI generated in the image by using the direction information of the first device 202. Furthermore, the image data generating apparatus 100 may determine a size of an ROI generated in the image by using the distance information. The image data generating apparatus 100 may generate image data of the image by using the acquired image and the set ROI.

The image data generating apparatus 100 may output only image data of an image portion corresponding to the ROI in the image of the image data. Meanwhile, the image data generating apparatus 100 may acquire only an image corresponding to the ROI and output image data corresponding to the acquired image.

The image data generating apparatus 100 may perform an image effect only on any one of the image portion corresponding to the ROI and the image portion not corresponding to the ROI. For example, the image data generating apparatus 100 may perform an out-focusing effect by blurring the image portion not corresponding to the ROI compared to an original image.

Alternatively, the image data generating apparatus 100 may perform image effects on both of the image portion which correspond to the ROI and the image portion which do not correspond to the ROI. For example, the image data generating apparatus 100 may process the image portion corresponding to the ROI to be brighter, and may process the image portion not corresponding to the ROI to be darker, compared to the original image.

The image data generating apparatus may generate small-capacity image data of an input image, and further generate an ROI in the image of the small-capacity image data. The image data generating apparatus may generate large-capacity image data corresponding to the ROI.

Here, the image data generating apparatus may display the ROI set in the image of the small-capacity image data to a user and may be confirmed by the user whether the ROI is properly set. The user may reset a position or size of the ROI displayed on the small-capacity image data. The image data generating apparatus may generate the large-capacity image data corresponding to the ROI after the user confirms the ROI.

The image data generating apparatus may perform image recognition on the acquired image. The image data generating apparatus may determine the position of the ROI according to a position of an object recognized in an image. The image data generating apparatus may determine a size of the ROI according to a size of the object recognized in the image. Furthermore, the image data generating apparatus may determine a tracking speed of the object according to a moving speed of the position of the object recognized in the image.

FIG. 7 is a view of an example of setting an ROI according to an image data generating method, according to an embodiment of the inventive concept. FIG. 7 illustrates an example of setting an ROI in an image by recognizing an object under mutually different conditions.

An image data generating apparatus according to an exemplary embodiment may set the ROI by using position information of the object that is transmitted from the transceiving device 202 worn by the object. The image data generating apparatus may determine position information of the object by using an electric wave transmitted from the transceiving device 202.

As illustrated in FIG. 7, an ROI 711 of the object on a left side image 710 and an ROI 721 of the object on a right side image 720 respectively identify the object by using the transceiving device 202 worn by the object. In FIG. 7, the object in the left side image 710 and the object on a right side image 720 may be displayed on the image in totally different ways. As the image data generating apparatus recognizes a position of the object by using the transceiving device 202 worn by the object, regardless of how the object displayed on the image, the image data generating apparatus may set the ROIs by identifying the object to photograph.

The object may wear or attach the transceiving device 202 on a body part which should be set as an ROI. For example, the transceiving device 202 may be a type of a hair pin, a bracelet, an earring, or a sticker. For example, in FIG. 7, a performer may put a hair pin as the transceiving device 202 on her hair so that the ROI is set on her hair. Accordingly, the image data generating apparatus 100 may receive an electric wave from the hair pin as the transceiving device 202, determine a position of the transceiving device 202 by using a beam forming method, and thus determine the hair part of the performer as the ROI.

FIG. 8 is a detailed flowchart illustrating an ROI generating method in an image data generating method, according to an embodiment of the inventive concept. First, the image data generating apparatus 100 generates direction information of the object and distance information from the object (S810). The image data generating apparatus 100 may determine characteristics of an electric wave transmitted from the transceiving device 202 worn by the object and generate the object direction information and the distance information from the object.

Next, the image data generating apparatus 100 specifies a position of the object in an image (S820). The specifying method of the position of the object by the image data generating apparatus 100 will be described below with reference to FIG. 9.

Next, the image data generating apparatus 100 may recognize the object and a movement of the object in the image (S830). The recognition method of the object and the object's movement by the image data generating apparatus 100 will be described below with reference to FIGS. 11 to 13.

Next, image data generating apparatus 100 may generate the ROI in the image (S840). The image data generating apparatus 100 may generate image data corresponding to the ROI of the image by using the ROI.

FIG. 9 is a view illustrating a position of an object specifying method by the image data generating apparatus 100, according to an embodiment of the inventive concept. The image data generating apparatus 100 according to an exemplary embodiment may specify a position of the object in an image by using direction information of the transceiving device 202 transmitted from the transceiving device 202.

The image data generating apparatus 100 may be a camera 910. The camera 910 determines the position of the transceiving device 202 by using a beam forming method and determines the position of the object according to the determined position of the transceiving device 202.

As a first object 921 located on a right side with respect to the camera 910 is located on a right side of a viewing angle of the camera 910, the first object 921 may be located on a right side of an original image generated by the camera 910. Therefore, the camera 910 may set an ROI 920 of the first object 921 on a right side of the image.

As a second object 931 located on a right side with respect to the camera 910 is located on a right side of a viewing angle of the camera 910, the second object 931 may be located on a right side of the original image generated by the camera 910. However, as the second object 931 is located near a center of the viewing angle compared to the first object 921, the second object 931 may be located closer to a center of the original image generated by the camera 910 than the first object 921. The camera 910, according to a virtual angle dividing the viewing angle, determines an angle in which the transceiving device 202 is located corresponding to the viewing angle, and thus an angle of the object in the image may be determined. In another embodiment, the camera 910 generates a virtual two-dimensional grid corresponding to the image and specifies the position of the transceiving device 202 in the grid according to the characteristics of the electric wave transmitted from the transceiving device 202, and thus a position of the object in the image may be determined. Therefore, the camera 910 may set an ROI 930 in an image according to the position of the object.

As a third object 941 located on a left side with respect to the camera 910 is located on a left side of a viewing angle of the camera 910, the third object 941 may be located on a left side of an original image generated by the camera 910. Therefore, the camera 910 may set an ROI 940 of the third object 941 in the left side of the image.

Furthermore, with reference to FIG. 9, the camera 910 may set an ROI by using a distance between the transceiving device 202 and the camera 910. In an exemplary embodiment, when the distance between the transceiving device 202 and the camera 910 is long, the camera 910 may zoom in an image by using a lens of the camera 910 and generate the ROI. Alternatively, in order to generate an ROI containing a certain size of an object regardless of a distance from the original image, the camera 910 may reduce the size of the ROI when the distance is long and may increase the size of the ROI when the distance is short.

FIG. 10 is a diagram illustrating characteristics of an electric wave used by the image data generating apparatus 100 and the transceiving device 202, according to an embodiment of the inventive concept. As illustrated in FIG. 10, an electric wave in the 60 GHz band satisfying the 802.11 ad standard has higher directionality compared to an electric wave in the 50 GHz band satisfying the 802.11 ac standard. Therefore, the image data generating apparatus 100 and the transceiving device 202 according to an exemplary embodiment may determine each position and a distance between them by transceiving the electric wave in the 60 GHz band satisfying the 802.11 ad standard.

FIGS. 11 to 13 are views illustrating an image data generating method using an ROI generated by tracking a moving object by the image data generating apparatus 100, according to an embodiment of the inventive concept. FIGS. 11 to 13 illustrate a recognition method of the object and movement of the object by the image data generating apparatus 100 according to an exemplary embodiment. FIG. 11 illustrates a camera 1110 and an image corresponding to a viewing angle of the camera 1110. As illustrated in FIG. 11, the image data generating apparatus 100 may set an ROI 1120 of a performer 1130 wearing the transceiving device 202.

As illustrated in FIG. 12, according to a movement of the performer wearing the transceiving device 202 over time, the performer is sequentially displayed at a position 1121, a position 1122, and a position 1123.

According to the movement of the performer 1130, a position of the transceiving device 202 worn by the performer 1130 also moves. The image data generating apparatus 100 may determine the change in the position of the transceiving device 202 by analyzing an electric wave transmitted from the transceiving device 202. The image data generating apparatus 100 may determine a position of the performer in the image according to the movement of the performer.

The image data generating apparatus 100 determines the position of the transceiving device 202 by analyzing the electric wave transmitted from the transceiving device 202. Furthermore, the image data generating apparatus 100 sets an ROI that is expected to be displayed with the performer which is expected to be located in the same position as the position of the transceiving device 202 in the image by using the determined position of the transceiving device 202. The image data generating apparatus 100 may set the ROI in a portion that is expected to be displayed with the performer in the image, as shown in FIG. 12. Furthermore, the image data generating apparatus 100 may detect the object from the ROI that is expected to be displayed with the performer, and may adjust a position of the ROI so as to locate a center position of the detected object in a center of the ROI.

The image data generating apparatus 100 may generate a result image by using only an image of the ROI determined above. FIG. 13 illustrates image data outputting only the image corresponding to the ROI.

FIGS. 14 and 15 are conceptual diagrams illustrating a method of generating an image corresponding to an ROI by the image data generating apparatus 100, according to an embodiment of the inventive concept.

FIG. 14 illustrates a general method of generating an image corresponding to the ROI in an original image. The captured original image 1410 is converted into a first image 1420 of a resolution desired by a user. Generally, in order to display the image with relatively small data, the resolution of the first image 1420 is set lower than a resolution of the original image 1410. Therefore, data of displaying the first image 1420 is generated by omitting a part of the data of displaying the original image 1410.

When an ROI 1421 is set in the first image 1420 and the image corresponding to the ROI 1421 is converted again into a second image 1430 of a resolution desired by a user, the second image 1430 is generated by expanding a part of the first image 1420, generally. The first image 1420 includes only data of a partial image in the original image 1410. Smaller image data is required when the first image 1420 is used to generate the second image 1430 than when the image data of the original image 1410 is used. The second image 1430 has lower quality than an image displaying the ROI separated from the original image 1410. For example, the second image 1430 is more blurred than the corresponding part of the original image, shows blocks, or includes a lot of noise.

FIG. 15 illustrates a method of generating an image corresponding to an ROI by the image data generating apparatus 100, according to an embodiment of the inventive concept.

The image data generating apparatus 100 according to an exemplary embodiment generates an ROI 1511 in an original image 1510, and further generates a partial image corresponding to the ROI as an output image 1520. Therefore, the image data generating apparatus 100 according to an exemplary embodiment may generate the output image 1520 by using all of image data included in the original image 1510. Therefore, the image data generating apparatus 100 may generate the output image 1520 having higher quality than the original image 1510.

FIG. 16 is a view illustrating a method of setting an ROI by an image data generating apparatus, according to an embodiment of the inventive concept.

As described above, the image data generating apparatus 100 may specify a position of the transceiving device 202 in an image by using an electric wave of the transceiving device 202. Furthermore, the image data generating apparatus 100 may generate an ROI by using the position of the transceiving device 202 in the image. The image data generating apparatus 100 may specify the position of the transceiving device 202 in the image, and detect an object adjacent to a position of the specified transceiving device 202, and thus, may specify the object to be photographed by a user. In addition, the image data generating apparatus 100 may generate an ROI including an image in which the object to be photographed is displayed. For example, when the object is detected on a part corresponding to the position of the transceiving device 202 in the image, the image data generating apparatus 100 may generate an ROI so as to include the object.

A method of setting an ROI by the image data generating apparatus 100, which sets the ROI with respect to the object according to a preset method, will be described with reference to FIG. 16.

The image data generating apparatus 100 may store previously a method of setting the ROI corresponding to the object as a program. The image data generating apparatus 100 may determine a position of the object, which is disposed in the ROI according to user input or the preset method.

The image data generating apparatus 100 may detect an object 1611 from an original image 1610 by using the position of the transceiving device 202. The image data generating apparatus 100 may set the ROI so as to dispose the object 1611 on a left side of the ROI (1620).

The image data generating apparatus 100 may set the ROI so as to dispose the object 1611 in a center of the ROI (1630). The image data generating apparatus 100 may set the ROI so as to dispose the object 1611 on a right side of the ROI (1640).

The image data generating apparatus 100 may set the ROI so as to dispose the object 1611 in the ROI by expanding the object 1611 (1650). The image data generating apparatus 100 may set the ROI so as to dispose the object 1611 in the ROI by reducing the object 1611 (1660).

FIG. 17 is a view illustrating a method of generating an object image moving quickly by the image data generating apparatus 100, according to an embodiment of the inventive concept.

As illustrated in FIG. 17, when an object moves quickly, an image generation speed by setting an ROI corresponding to the object in an image may be slower than an object's moving speed. Therefore, quality of the image may be relatively low due to severe shaking of the object in the image.

The image data generating apparatus 100 according to an exemplary embodiment may control a moving and reset speed of the ROI in the image. For example, the image data generating apparatus 100 may control the moving and reset speed of the ROI moving in the image in pixel/sec units. The image data generating apparatus 100 may limit the maximum speed of the moving and resetting of the ROI in the image according to hardware performance or a value set previously by a user.

The image data generating apparatus 100 according to an exemplary embodiment may control a moving and reset distance of the ROI in the image. For example, the image data generating apparatus 100 may control the moving and reset distance of the ROI in the image in pixel units. The image data generating apparatus 100 may limit the reset distance of the ROI by moving once in the image according to hardware performance or a value set previously by a user.

Furthermore, the image data generating apparatus 100 according to an exemplary embodiment may set an ROI reset frequency corresponding to the moving object. The image data generating apparatus 100 may limit the ROI reset frequency so as not to reset the ROI with a frequency that is higher than the previously set value.

For example, when the object moves quickly in the image, the image data generating apparatus 100 may limit an ROI reset frequency to locate the object in a specific position of the ROI with a frequency that is the same as or lower than the previously set value. Alternatively, the image data generating apparatus 100 may set the ROI to be reset only when the object deviates from the ROI. The image data generating apparatus 100 may determine the ROI reset frequency according to user input.

FIGS. 18 to 23 are views illustrating methods of resetting an ROI by the image data generating apparatus 100, according to an embodiment of the inventive concept. The method of resetting the ROI by the image data generating apparatus 100 according to an exemplary embodiment will be described with reference to FIGS. 18 to 23.

The image data generating apparatus 100 according to an exemplary embodiment may further include a display unit and display a captured image on the display unit. Furthermore, the image data generating apparatus 100 may display the ROI set in the captured image displayed in real time on the display unit. The image data generating apparatus 100 may reset the ROI set in the captured image by receiving user input.

The image data generating apparatus 100 according to an exemplary embodiment may set the ROI in an image by the method described above. FIG. 18 illustrates the captured image displayed on the display unit of the image data generating apparatus 100. With reference to FIG. 18, by receiving an electric wave from a transceiving device 1810 by using a beam forming method, the image data generating apparatus 100 may analyze a receiving direction and intensity of the electric wave and specify a position of the transceiving device 1810 in the image.

FIG. 19 illustrates a state at which an ROI is set in an image displayed on the display unit of the image data generating apparatus 100 according to an exemplary embodiment. The image data generating apparatus 100 may set an ROI 1820 in the captured image by locating a position of the transceiving device 1810 that is specified in the captured image in a center of the captured image and may display the ROI 1820 and the captured image on the display unit. As illustrated in FIG. 19, as the ROI is generated based on the position of the transceiving device 1810 displayed on the image, the ROI may be set in a region not desired by a user. As described above, the image data generating apparatus 100 may reset the ROI by recognizing an object in the image. Furthermore, the image data generating apparatus 100 may change and reset a position and size of the ROI in the image according to a previously set value. For example, the image data generating apparatus 100 may set a new ROI 1830 illustrated in FIG. 20 by moving the position of the ROI x pixel to an upper side and y pixel to a left side in the image according to the previously set value, and may further set a new ROI 1840 as shown in FIG. 21 by expanding the ROI size to z %. In this case, x, y and z are real numbers. In addition, the image data generating apparatus 100 may reset the ROI by user input.

FIG. 20 illustrates a state at which the image data generating apparatus 100 according to an exemplary embodiment resets an ROI by user input. The image data generating apparatus 100 may change a position of the ROI set in a captured image by user input.

The image data generating apparatus 100 may have an input device such as a button, a pointing device, or a touch pad and may set a specific region of the captured image as the ROI by user input. The above input devices are only examples and the kind of the input devices is not limited thereto. For example, the display unit may be a touch screen. The image data generating apparatus 100 may reset the ROI position to a position of the new ROI 1830, as shown in FIG. 20, by setting a position of the touch screen touched by a user as a center point. The display unit may display only the captured image and the reset new ROI 1830.

FIG. 21 illustrates a state at which the image data generating apparatus 100 according to an exemplary embodiment expands and resets an ROI by user input. The image data generating apparatus 100 may change a size of the ROI set in a captured image by user input.

The image data generating apparatus 100 may have an input device as described above and change the ROI size with the input device. For example, two virtual vertexes may be input by touch input to the display unit. When a maintained distance between the two vertexes becomes longer according to a continuous touch input, the image data generating apparatus 100 may expand a size of the ROI 1830 like the new ROI 1840.

FIG. 22 is a view illustrating a method of expanding, moving, and resetting an ROI by the image data generating apparatus 100, according to an embodiment of the inventive concept. The image data generating apparatus 100 may reset the ROI on a display unit by using the position changing method of the ROI described with reference to FIG. 20 and the size changing method of the ROI described with reference to FIG. 21.

For example, the image data generating apparatus 100 may set a new ROI 1850 by changing a position of the ROI after changing a size of the ROI. Furthermore, the image data generating apparatus 100 may change the ROI size after changing the ROI position.

Alternatively, the image data generating apparatus 100 may simultaneously change the position and size of the ROI by using the position change of the two vertexes which are input through the display unit. For example, the ROI may be reset by using the distance change between the two vertexes as a parameter for changing the ROI size, and the position change of the midpoint of the distance between the two vertexes as a parameter for changing the ROI position.

FIG. 23 a view illustrating an image which is recorded by using the reset ROI of FIG. 22 by the image data generating apparatus 100 according to an exemplary embodiment. The image data generating apparatus 100 may display the entire frame of the image and an ROI on a display unit and record an image belonging to the ROI in a memory as in FIG. 23. Alternatively, the image data generating apparatus 100 may record the image belonging to the ROI in the memory while displaying the image, as in FIG. 23.

Meanwhile, the exemplary embodiments can be written as computer programs and can be implemented in general-use digital computers that execute the programs using a computer-readable recording medium. The computer-readable recording medium is any data storage device that can store programs or data which can be thereafter read by a computer system. Examples of the computer-readable recording medium include magnetic storage media (e.g., ROM, RAM, USB, floppy disks, hard disks, etc.), optical recording media (e.g., CD-ROMs, or DVDs), PC interfaces (e.g., PCI, PCI-express, or WiFi), and so on.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A method of operating an image capturing apparatus, the method comprising:
   receiving, by a transceiver, a directional electric wave transmitted from an external device accompanied by an object;
   obtaining, by an image sensor, a full frame image including an image of the object;
   determining, by at least one processor, a direction of the object by using a direction from which the directional electric wave is received;
   determining, by the at least one processor, a distance between the object and the image capturing apparatus by using an intensity of the received directional electric wave;
   determining, by the at least one processor, a region of interest (ROI) as a portion of the full frame image, based on the determined direction and the determined distance, wherein the image of the object is included in the ROI; and
   generating, by the at least one processor, image data by using the ROI.

2. The method of claim 1, wherein the determining of the direction of the object comprises:
   determining, by the at least one processor, the direction from which the directional electric wave is received with strongest intensity by using a beam forming method; and
   determining, by the at least one processor, the direction of the object by using the determined direction from which the directional electric wave is received.

3. The method of claim 1, wherein the determining of the ROI comprises:
   determining, by the at least one processor, a position of the ROI in the full frame image by using the direction of the object.

4. The method of claim 1, wherein the determining of the ROI comprises:
   determining, by the at least one processor, a size of the ROI in the full frame image by using the distance between the object and the image capturing apparatus.

5. The method of claim 1, wherein the generating of the image data by using the ROI comprises:
   generating, by the at least one processor, image data of the full frame image; and
   outputting, by the at least one processor, image data of an image portion corresponding to the ROI among the image data of the full frame image.

6. The method of claim 1, wherein the generating of the image data by using the ROI comprises:
   generating, by the at least one processor, image data of an image portion corresponding to the ROI in the full frame image; and
   outputting, by the at least one processor, the generated image data.

7. The method of claim 1, wherein the generating of the image data by using the ROI comprises:
   generating, by the at least one processor, first image data of the full frame image with low resolution; and
   generating, by the at least one processor, second image data of an image portion corresponding to the ROI in the full frame image with high resolution.

8. The method of claim 1, wherein the determining of the ROI comprises determining a position of the ROI according to a position of the image of the object in the full frame image.

9. A non-transitory computer-readable recording medium recorded with a program for performing a method of operating an image capturing apparatus, the method comprising:
   receiving, by a transceiver, a directional electric wave transmitted from an external device accompanied by an object;
   obtaining, by an image sensor, a full frame image including an image of the object;
   determining, by at least one processor, a direction of the object by using a direction from which the directional electric wave is received;
   determining, by the at least one processor, a distance between the object and the image capturing apparatus by using an intensity of the received directional electric wave;
   determining, by the at least one processor, a region of interest (ROI) as a portion of the full frame image, based on the determined direction and the determined distance, wherein the image of the object is included in the ROI; and
   generating, by the at least one processor, image data by using the ROI.

10. An apparatus for capturing an image, the apparatus comprising:
    a transceiver configured to receive a directional electric wave transmitted from an external device accompanied by an object,
    an image sensor configured to obtain a full frame image including an image of the object, and
    at least one processor configured to:
      determine a direction of the object by using a direction from which the directional electric wave is received;

determine a distance between the object and image capturing apparatus by using an intensity of the received directional electric wave;

determine a region of interest (ROI) as a portion of the full frame image, based on the determined direction and the determined distance, wherein the image of the object is included in the ROI; and generate image data by using the ROI.

11. A system for generating image data, the system comprising:

a transceiving device accompanied by an object and comprising a transceiver, the transceiver configured to transmit a directional electric wave to an image capturing apparatus; and the image capturing apparatus comprising:
a transceiver configured to receive the directional electric wave transmitted from the transceiving device,
an image sensor configured to obtain a full frame image including an image of the object, and
at least one processor configured to:
determine a direction of the object by using a direction from which the directional electric wave is received,
determine a distance between the object and the image capturing apparatus by using an intensity of the received directional electric wave,
determine a region of interest (ROI) as a portion of the full frame image, based on the determined direction and the determined distance, wherein the image of the object is included in the ROI, and
generate image data by using the ROI.

12. The method of claim 1, wherein the determining of the ROI comprises:

determining, by the at least one processor, a size of the ROI according to a size of the image of the object in the full frame image.

13. The method of claim 1, wherein the determining of the ROI comprises:

determining, by the at least one processor, a tracking speed of the ROI according to a moving speed of the image of the object in the full frame image.

14. The method of claim 1, wherein the determining of the ROI comprises:

adjusting, by the at least one processor, at least one of a position and a size of the ROI according to a previously set value.

15. The method of claim 1, wherein the determining of the ROI comprises:

adjusting, by the at least one processor, at least one of a position and a size of the ROI according to a user input.

16. The method of claim 1, wherein the generating of the image data by using the ROI comprises:

applying, by the at least one processor, different image effects to each of a portion of the full frame image which corresponds to the ROI and another portion of the full frame image which does not correspond to the ROI.

17. The method of claim 1, wherein the generating of the image data by using the ROI comprises:

applying, by the at least one processor, an image effect to only one of a portion of the full frame image which corresponds to the ROI and another portion of the full frame image which does not correspond to the ROI.

* * * * *